United States Patent [19]

Röhling et al.

[11] Patent Number: 5,005,700
[45] Date of Patent: Apr. 9, 1991

[54] GAS TIGHT PACKAGING WITH A SAFETY DEVICE

[75] Inventors: Holmer Röhling, Reinfeld; Christoph Bauer, Bad Schwartau; Harald M. Friedrichs, Lübeck; Roderich Thometschek, Stockelsdorf, all of Fed. Rep. of Germany

[73] Assignee: Drägerwerk Aktiengesellschaft, Lübeck, Fed. Rep. of Germany

[21] Appl. No.: 468,616

[22] Filed: Jan. 23, 1990

[30] Foreign Application Priority Data

Jan. 25, 1989 [DE] Fed. Rep. of Germany ....... 3902118
Mar. 27, 1989 [DE] Fed. Rep. of Germany ....... 3907706

[51] Int. Cl.$^5$ ............................................ B65D 73/00
[52] U.S. Cl. ................................ 206/459; 206/524.8; 206/601; 206/807
[58] Field of Search ...................... 206/45.31, 305, 363, 206/438, 459, 601, 616, 618, 524.8, 807

[56] References Cited

U.S. PATENT DOCUMENTS

| | | | |
|---|---|---|---|
| 3,467,244 | 9/1969 | Mahaffy et al. | 206/524.8 |
| 3,730,338 | 5/1973 | Chesky | 206/459 |
| 3,885,668 | 5/1975 | McClain | 206/459 |
| 4,570,818 | 2/1986 | Borst et al. | 206/459 |
| 4,646,934 | 3/1987 | McAllister | 206/524.8 |

Primary Examiner—David T. Fidei
Attorney, Agent, or Firm—McGlew & Tuttle

[57] ABSTRACT

A gas-tight packaging arrangement for a device, such as a respirator containing an oxygen releasing chemical. The arrangement includes a safety device for checking the state of the packaging. The safety device acts on an elastic partial area of an evacuated envelope surrounding the device. The envelope may be made of foil or the like. The state of the packaging is indicated through a viewing window provided on a housing surrounding the envelope. A loss of vacuum is indicated by providing a tensioned non-elastic band surrounding at least part of the circumference of the envelope. The non-elastic band includes a visible mark band part which may be viewed through the viewing window. The visible mark band part includes a breaking point, the breakage of the visible mark band part being visible through the viewing window. To tension the non-elastic band, a strain relief element may be provided bridging the visible mark band part such that the belt may be tensioned without breaking the visible mark band part.

10 Claims, 2 Drawing Sheets

5,005,700

GAS TIGHT PACKAGING WITH A SAFETY DEVICE

FIELD AND BACKGROUND OF THE INVENTION

The present invention pertains to a gas-tight packaging for a device, especially a respirator containing a chemical which releases oxygen. A safety device is provided for checking the state of packaging. The safety device acts on a flexible partial area of an envelope which surrounds the respirator and is under vacuum, and whose status indication is made visible by a visible mark surrounding the envelope on a housing.

Instruments or devices which must be protected in the state of storage or during readiness from undesired or harmful effects originating from the surrounding atmosphere are preferably placed in a gas-tight packaging. In the field of respirators, such devices are especially devices in which a cartridge containing a chemical releasing oxygen is put into operation when needed. Since the release of oxygen is maintained essentially by the moisture present in the breathing air, these devices must be protected especially from the penetration of water vapor during the readiness period.

A respirator according to West German Patent Specification No. 909,299 is accommodated in a double housing whose inner housing part can be evacuated. A spring-loaded pin, which is led through the solid outer housing as a visible mark, is placed on a movable diaphragm part. In the evacuated state, the force pulling the pin toward the inside is compensated by the spring pressure, so that the pin end is flush with the outer housing. The spring force prevails only when the vacuum in the inner housing subsides, so that said pin will project above the contour of the outer housing. It can thus be recognized that the packaging of the device is no longer sealed satisfactorily.

A disadvantage of the prior-art packaging is the fact that the visible marking must be positioned precisely at the suitable place on the inner housing, i.e., the diaphragm valve, in order to be recognizable in the intended place even through the outer housing. In addition, the spring force of the pressure spring must be adjusted to the maximum vacuum that can be reached in order to ensure detection of the declining vacuum, because, for example, excessive spring force (or too low a vacuum) may lead to misinterpretation, since the pin will project above the outer shell despite the fact that the vacuum meets the specifications. In addition, the external shape of the device to be packaged determines the design of the safety device. A device of a different shape requires at least adapters if the same safety device is to be retained; in any case, a modified design of the device is required.

SUMMARY AND OBJECTS OF THE INVENTION

It is an object of the present invention to improve a packaging of the type specified such that the safety device will indicate a loss of vacuum regardless of the value of the vacuum established, and which the safety device is installed, unaffected by the external shape of the device to be packaged and can be manufactured with simple technical means without any need to adapt the geometry or the force relations to one another.

According to the invention, a safety device is provided including tensioned and nonelastic bands which partially extend over the circumference of the envelope designed as an evacuable vacuum film and is in contact with the circumference, wherein said bands have a band part containing a visible mark.

The advantages of the present invention include essentially the fact that the device can first be placed into its envelope and the envelope can subsequently be sealed under vacuum, and that the bands can subsequently be placed on the evacuated envelope without any need to take into account the external shape of the device to be packaged in the housing. The nonelastic bands are tensioned to the point that the visible mark does not yet become visible. The envelope inflates and its circumference increases only on penetration of surrounding atmosphere, as a result of which the tensile stress on the bands increases so much that the visible mark can be seen. A sensitive safety device is thus obtained, whose sensitivity can be increased simply by increasing the size of the band area which is in contact with the envelope and responds to the inflation. The design and the sensitivity of the bands can therefore be adapted simply to the design of the actual device. Not only is mechanical damage to the vacuum envelope detected, but, in the case of respirators containing a chemical releasing oxygen, even the undesirable diffusion of water vapor into the device, as a result of which the chemical produces oxygen, thus breaking the vacuum prematurely and rendering the device unfit for use. A ball in a sleeve is suitable for use as a visible mark, in which case the ball is held in its resting position by a compression spring, on one hand, and it acts on the bands, on the other hand. In the case of loss of vacuum, it is removed from its resting position against the action of the spring pressure to the extent that this state becomes recognizable, i.e., the ball is now visible to the observer through the sight window. Such a design offers the advantage that accurate positioning and laying in of the band part relative to the general course of the bands is not necessary due to the ball being guided in said sleeve.

The bands may act either on two holding points on the circumference of the envelope or on one holding point of each of the envelope and the housing. This possibility of selection makes it even easier to optimize the direction of the band for effective checking. The fact that the visible mark of the band part can be seen in a sufficiently wide sight window in the housing offers even more freedom in selecting the place for the safety device.

The bands may consist of thread loops on the envelope or a flexible, thin and strong film band. It is advantageous in both cases to make the band part bearing the visible mark from a film which has a notch as a predetermined breaking point, which notch extends essentially at right angles to the direction of pull produced by the tensioning force acting on said band. It is advantageous in this connection to provide for an additional possibility of adjustment of the sensitivity to the rupture of the predetermined breaking point by making a deeper or less deep notch.

In an advantageous embodiment, the visible mark of the band part is made recognizable through a sight window provided in the housing.

To further improve the recognizability of an intact or destroyed predetermined breaking point, the band part may be provided with a distinct color (signal color) and it may be placed loosely over a band guide which is covered when the band part is intact, so that, e.g., the person performing the checking sees a green zone, which indicates the fitness of the device for use. If the predetermined breaking point has been destroyed, the broken band part releases the band guide, whose surface, which is, e.g., red, becomes visible, thus indicating that the device should not be used.

To facilitate placing the band around devices provided with a vacuum envelope and with a complicated or even extensive and jagged surface structure, it is advantageous to design the bands as open bands which can be placed freely around the envelope and subsequently closed with a strap, reduced to the length needed, and subjected to the required tensile stress. The band part containing the predetermined breaking point may either branch off from the band as a tongue or be provided at a suitable point in the path of the band guide. If the band is a film band, the band need only be notched at the point required in order to obtain the band part with the predetermined breaking point, which is visible from the outside, as part of the entire band.

It is a further object of the present invention to provide such a gas-tight packaging so that a band-like safety device that is to be subjected to tension can be applied with relative ease in order to prevent the predetermined breaking point from being accidentally damaged during the packaging process and to thus ensure reliable setting of the necessary tension.

To achieve this task according to a second embodiment of the invention, a strain relief means bridging over the band section, which can be removed after tensioning of the bank, is provided for tensioning the band.

The advantage of this aspect of the present invention is essentially the fact that the band can be mounted without regard to possible damage to the visual marking, according to the actual conditions in terms of the outer shape of the device to be packaged. After mounting, the necessary tension is brought about by suitable looping and checked if necessary. After the tension has been found to be correct, the strain relief means is removed, and the tension now acts on the band section containing the visual marking without damaging it.

The band section preferably consists of a film, whose visual marking is designed in the form of two predetermined breaking points that consist of two notches which are placed on opposite sides of the band and extend essentially transversely to the direction of the tension. A cable section, designed as a strain relief means, which bridges over the band section containing the visual marking and can be cut through, is provided for tensioning said band. Once the band has been placed around the packaging and tensioned, the cable section needs only be cut through in order to apply the tension to the band section containing the visual markings. The two notches, starting from opposite sides of the band, are designed such that in the case of a possible inflation of the damaged vacuum package, at least one of the two incisions will be torn through completely, depending on the side of the band from which a possible damage to said visual marking can take place.

In a further development of the present invention, the cable section is made in one piece with said band and is attached to said band section via straps. Thus, one obtains a simple design of the band, which already contains the strain relief means, so that the packaged device can be strapped in a simple manner.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
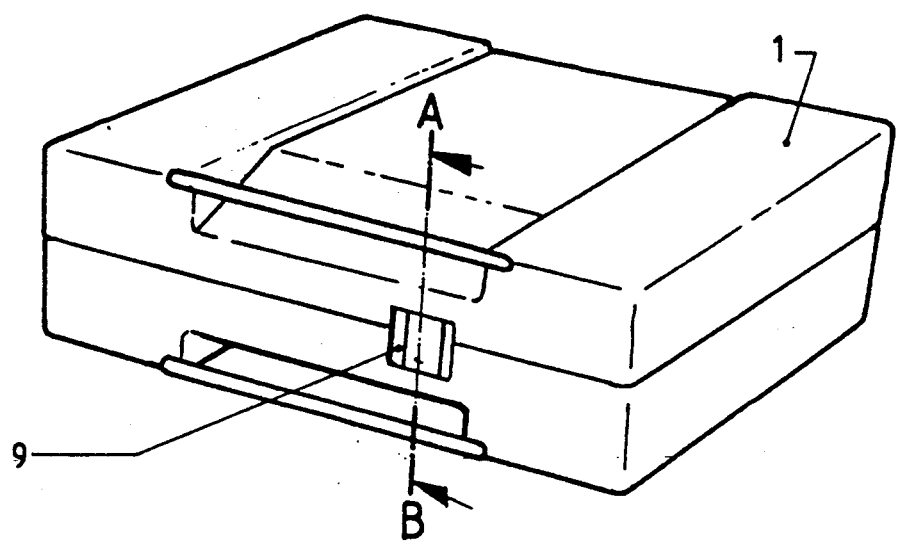
FIG. 1 is a perspective view of the packaging with the safety device according to the invention.
Figure 2:
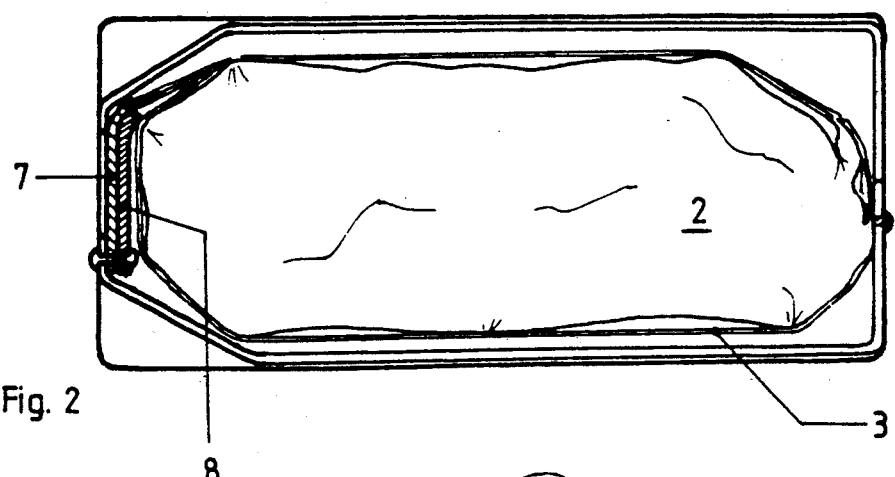
FIG. 2 is a cross-sectional view of the safety device taken along line A-B of FIG. 1.
Figure 3:
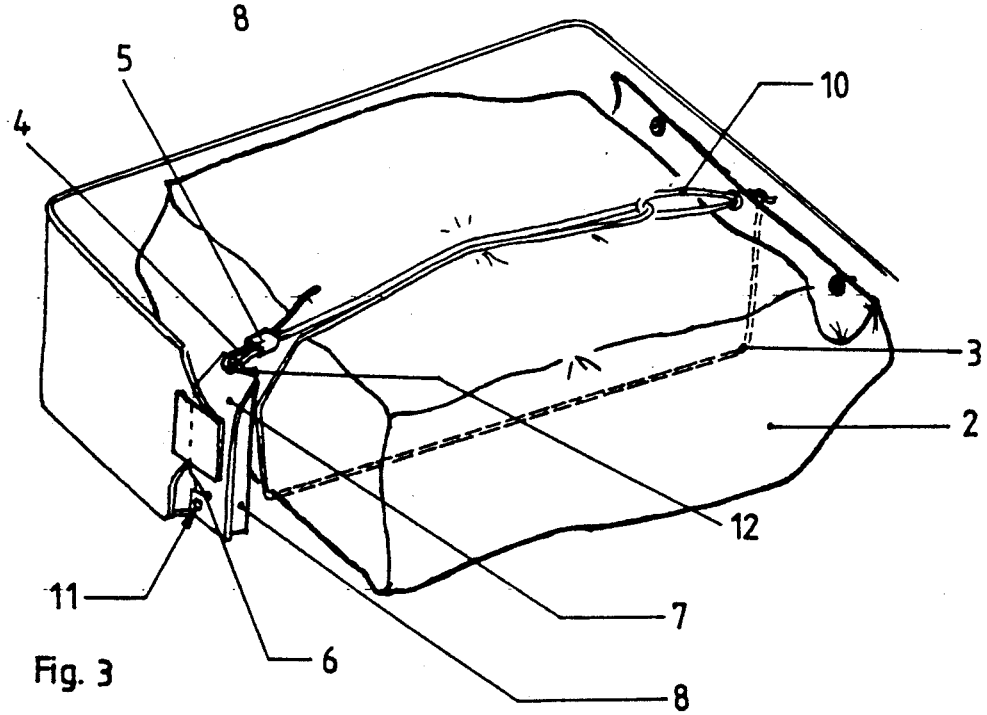
FIG. 3 is a perspective cut away view showing the band part with the predetermined breaking point according to the invention; and, FIG. 4 is an enlarged partial cutaway view of the safety device according to the invention with a strain release element.

FIG. 1 shows a double-shell housing 1 with a sight window 9. The housing 1 contains, in an envelope 2, a vacuum-packed device, which is surrounded with a band 3. The band 3 is in contact with at least part of the circumference of the envelope 2 (see FIG. 2). The tensile stress required for firm contact is ensured by a clip 5, which attaches band 3 to a band part 7 having a predetermined breaking point 6 via an eyelet 4 (see FIG. 3). The band part 7 is taken up on a band guide 8 and is fastened to the housing 1 behind a sight window 9.

The band 3 is placed around the envelope 2 and connected to to form a closed band loop 10. The band part 7 is attached to the eyelet 4 and placed behind the sight window 9 with the band guide 8. The band guide 8 is riveted to the top and bottom of the housing 1. The band part 7 is provided at its end with a pin 11 (see FIG. 3), with which it is fastened to the band guide 8. A predetermined breaking point 6 is notched or cut in said band part 7.

In the state shown, the band 3 is placed around the evacuated envelope 2 under a set tensile stress, using the clip 5. The band part 7 is connected to one side of the housing 1 via the pin 11 and the band guide 8, so that the tensile stress of the band guide both acts on said housing 1 and on the envelope 2. It is selected such that the predetermined breaking point 6 will remain intact. The envelope 2 expands to the point that the tensile stress acting on the band 3 increases beyond the stress the predetermined breaking point 6 is able to withstand only when the vacuum is broken as a result of leakage or the diffusion of gas into the envelope 2. This increase in force can be typically 2 N. As a result, the predetermined breaking point 6 breaks, and the green band part 7 will disappear behind said sight window 9 to expose the red surface of said band guide 8.

Figure 4:
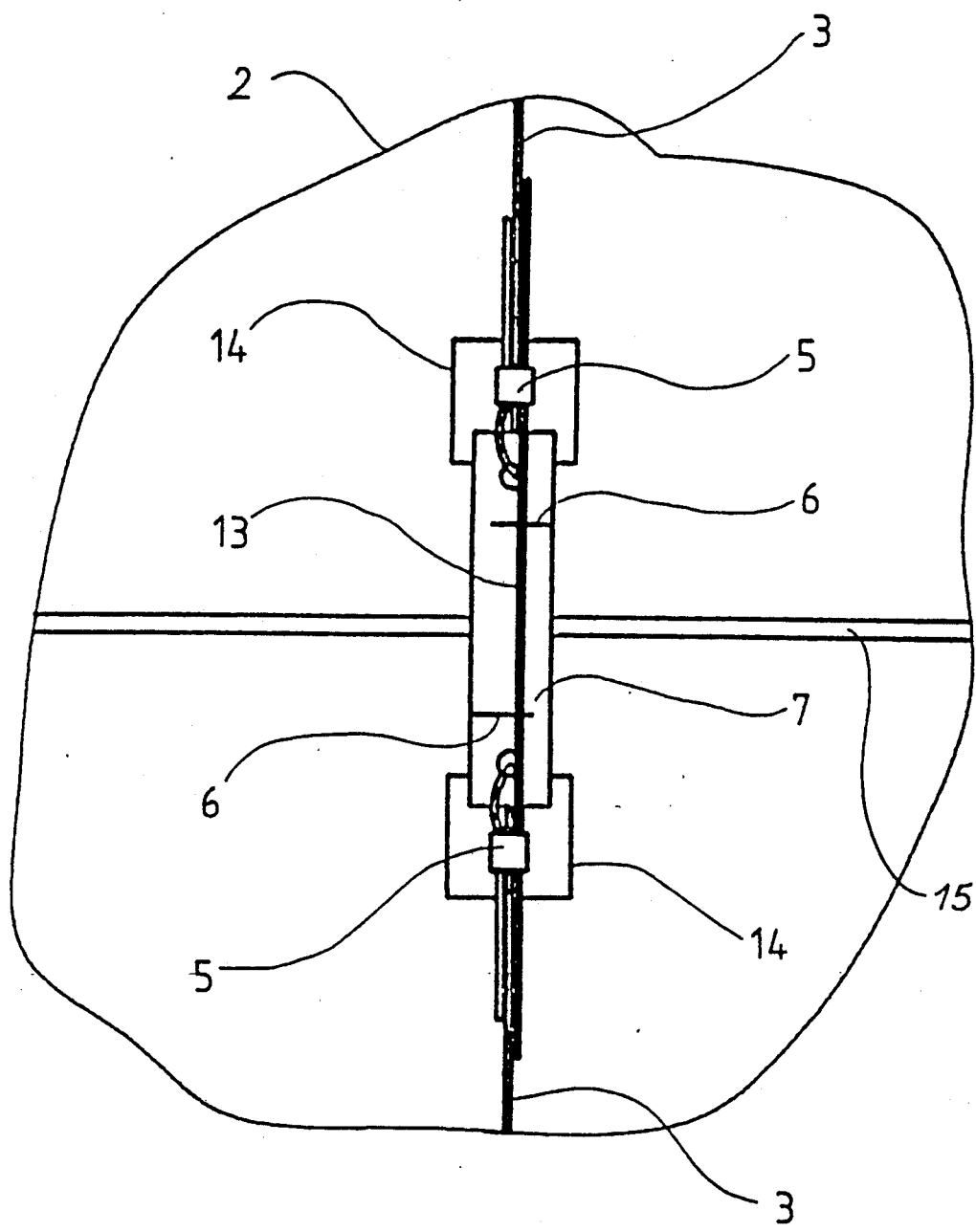

FIG. 4 shows a partial area of the envelope 2, which is attached as a film along the joint 15. The band 3 is placed around the envelope 2. The band 3 cooperates with a strain relief means 13 to bridge over the band section 7. The band 3 also has opposed ends connected to band section 7 that contain the notches 6 serving as a predetermined breaking point. The strain relief means 13 is designed as a cable section and is made in one piece with the band 3, which is looped on rings 5 in the form of seals. Below the seals there are provided reinforcing backings 14 for protection against friction for said envelope 2. The strain relief piece 13 protects the notches 6 of the band section 7 during tightening. The relief piece 13 may be removed after tightening.

While specific embodiments of the invention have been shown and described in detail to illustrate the application of the principles of the invention, it will be understood that the invention may be embodied otherwise without departing from such principles.

What is claimed is:

1. A gas-tight packaging arrangement for checking the vacuum seal of the packaging device comprising:
   an evacuated envelope surrounding the device, said evacuated envelope having an outer surface with an outer circumference a tensioned and substantially non-elastic band surrounding at least a part of the circumference of said envelope, said substantially non-elastic band being in contact with the outer surface of said envelope at said circumference, a visible mark band part connected to said band, said visible mark band part having a visible appearance which differs from said substantially non-elastic band; and a housing surrounding said envelope.

2. A gas-tight packaging arrangement according to claim 1, wherein said substantially non-elastic band bears on at least two fixed points on said envelope.

3. A gas-tight packaging arrangement according to claim 1, wherein said substantially non-elastic band bears on said envelope and is connected to said housing.

4. A gas-tight packaging arrangement according to claim 1, wherein said visible mark band part includes a film with a predetermined breaking point formed by a notch extending essentially at right angles to tensile stress applied to said substantially non-elastic band such that said tensile stress is concentrated at said notch.

5. A gas-tight packaging arrangement according to claim 1, wherein said visible mark band part may be viewed through a sight window provided on said housing.

6. A gas-tight packaging arrangement according to claim 4, wherein said visible mark band part is colored and is positioned over a band guide, said band guide being covered by said visible mark band part, said band guide being exposed when said predetermined breaking point has been destroyed at which time said band guide, having a color different from said visible mark band, becomes recognizable.

7. A gas type packaging arrangement according to claim 1, wherein said band connected to said visible mark band may be closed and tensioned as an open path of band by means of a strap connection including a tightening element.

8. A gas-type packaging arrangement according to claim 1, wherein said visible mark band is movable substantially along the circumference of said envelope upon expansion of said envelope.

9. A gas-tight packaging arrangement for checking the state of the packaging of a device, comprising:
   an evacuated envelope surrounding the device, said evacuated envelope having an outer surface with an outer circumference; a tensioned and substantially non-elastic band surrounding at least a part of the circumference of said envelope, said substantially non-elastic band being in contact with the outer surface of said envelope at said circumference, a visible mark band part connected to said band, said visible mark band part having a visible appearance which differs from said substantially non-elastic band such that tensile stress is transmitted to said visible mark band.

10. A gas-tight packaging arrangement for checking the state of the packaging of a device, comprising:
    an evacuated envelope surrounding the device, said evacuated envelope having an outer surface with an outer circumference; a tensioned and substantially non-elastic band surrounding at least a part of the circumference of said envelope, said substantially non-elastic band being in contact with the outer surface of said envelop at said circumference, a visible mark band part connected to said band, said visible mark band part having a visible appearance which differs from said substantially non-elastic band; a sight window provided on said housing said visible mark band part may be viewable through said window; said visible mark being movable with respect to said sight window upon expansion of said envelope.

* * * * *